US012488936B2

(12) United States Patent
Shiga et al.

(10) Patent No.: US 12,488,936 B2
(45) Date of Patent: Dec. 2, 2025

(54) MULTILAYER COIL COMPONENT

(71) Applicant: TDK CORPORATION, Tokyo (JP)

(72) Inventors: Yuto Shiga, Tokyo (JP); Youichi Kazuta, Tokyo (JP); Yuichi Takubo, Tokyo (JP); Junichiro Urabe, Tokyo (JP); Noriaki Hamachi, Tokyo (JP); Kazuya Tobita, Tokyo (JP); Toshinori Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 940 days.

(21) Appl. No.: 17/546,851

(22) Filed: Dec. 9, 2021

(65) Prior Publication Data

US 2022/0189683 A1 Jun. 16, 2022

(30) Foreign Application Priority Data

Dec. 14, 2020 (JP) ................................. 2020-206828

(51) Int. Cl.
*H01F 27/29* (2006.01)
*H01F 17/00* (2006.01)

(52) U.S. Cl.
CPC ....... *H01F 27/292* (2013.01); *H01F 17/0013* (2013.01)

(58) Field of Classification Search
CPC ............... H01F 27/292; H01F 17/0013; H01F 2017/004; H01F 27/28; H01F 17/00; H01F 27/29
USPC ............................ 336/65, 83, 192, 200, 232
See application file for complete search history.

(56) References Cited

U.S. PATENT DOCUMENTS

| | | | | |
|---|---|---|---|---|
| 2012/0243143 | A1* | 9/2012 | Iwanaga | H01G 4/005 361/301.1 |
| 2015/0145629 | A1 | 5/2015 | Chang et al. | |
| 2018/0027658 | A1 | 1/2018 | Choi et al. | |
| 2018/0197675 | A1 | 7/2018 | Kido | |
| 2018/0240591 | A1 | 8/2018 | Ishima et al. | |
| 2019/0214187 | A1 | 7/2019 | Imada | |
| 2020/0357557 | A1 | 11/2020 | Shiga et al. | |
| 2021/0065951 | A1* | 3/2021 | Arai | H01F 5/003 |

FOREIGN PATENT DOCUMENTS

| | | | | |
|---|---|---|---|---|
| JP | 2012-104745 | A | 5/2012 | |
| JP | 5678919 | B2 * | 3/2015 | H01G 4/008 |
| JP | 2015-103817 | A | 6/2015 | |
| JP | 2018-14482 | A | 1/2018 | |
| JP | 2018-113299 | A | 7/2018 | |

(Continued)

*Primary Examiner* — Tuyen T Nguyen
(74) *Attorney, Agent, or Firm* — Oliff PLC

(57) ABSTRACT

A multilayer coil component includes an element body, a coil, and an external terminal. The element body includes a plurality of insulator layers that is laminated. The coil is disposed in the element body. The external terminal includes a plurality of conductor layers that is laminated. The external terminal is electrically connected to the coil. The element body includes a main face and a first side face adjacent to the main face. The external terminal is embedded in the element body in such a way as to be separated from the first side face and exposed from the main face. The external terminal includes a first separated face that is separated from the first side face as being separated from the main face.

7 Claims, 7 Drawing Sheets

(56) References Cited

FOREIGN PATENT DOCUMENTS

| | | | |
|---|---|---|---|
| JP | 2018-137351 | A | 8/2018 |
| JP | 2019-125606 | A | 7/2019 |
| JP | 2020-184570 | A | 11/2020 |

* cited by examiner

MULTILAYER COIL COMPONENT

TECHNICAL FIELD

The present disclosure relates to a multilayer coil component.

BACKGROUND

Japanese Patent Application Laid-Open No. 2018-113299 discloses a multilayer coil component including an element body, a coil, and an external electrode disposed on a bottom face of the element body and separated from an end face of the element body. In the multilayer coil component, the external electrode is embedded in the element body in such a way as to be exposed from the bottom face of the element body.

SUMMARY

In the above-described electronic component, cracking or chipping may occur in the element body in the vicinity of the external electrode.

An aspect of the present disclosure provides a multilayer coil component capable of suppressing occurrence of cracking or chipping in an element body.

A multilayer coil component according to an aspect of the present disclosure includes an element body, a coil, and an external terminal. The element body includes a plurality of insulator layers that is laminated. The coil is disposed in the element body. The external terminal includes a plurality of conductor layers that is laminated. The external terminal is electrically connected to the coil. The element body includes a main face and a first side face adjacent to the main face. The external terminal is embedded in the element body in such a way as to be separated from the first side face and exposed from the main face. The external terminal includes a first separated face that is separated from the first side face as being separated from the main face.

In the multilayer coil component, the external terminal is embedded in the element body in such a way as to be separated from the first side face and exposed from the main face. Therefore, the element body includes a portion sandwiched between the first side face and the external terminal. Such a portion is thinner than other portions. Therefore, cracking or chipping is likely to occur. Therefore, the external terminal includes the first separated face that is separated from the first side face as being separated from the main face. Thus, the thickness of the thin portion sandwiched between the first side face and the external terminal can be increased. The occurrence of cracking or chipping can be suppressed. It is possible to maintain the area of an exposed face used for mounting in the external terminal. Therefore, it is possible to suppress a decrease in mounting strength.

A ridge portion between the main face and the first side face may have a chamfer shape. In this case, the thin portion sandwiched between the first side face and the external terminal is further thinned. Therefore, cracking or chipping is more likely to occur. Therefore, the configuration in which the external terminal includes the first separated face is more effective.

The ridge portion may have a rounded chamfer shape. A thickness of the external terminal may be greater than a radius of curvature of the ridge portion. In this case, the thin portion sandwiched between the first side face and the external terminal is long. Therefore, cracking or chipping is more likely to occur. Therefore, the configuration in which the external terminal includes the first separated face is more effective.

The ridge portion may have a rounded chamfer shape. The first separated face may be curved with a radius of curvature greater than a radius of curvature of the ridge portion. In this case, the thickness of the thin portion sandwiched between the first side face and the external terminal is easily increased.

The external terminal may be disposed outside the ridge portion. In this case, the ridge portion can be constituted only by the element body. The case of polishing depends on the material. Therefore, a chamfer shape is more easily formed by polishing in the ridge portion formed only of the element body than in the ridge portion formed of n plurality of materials.

The element body may further include a pair of second side faces adjacent to the main face. The first side face may be adjacent to each of the pair of second side faces. The pair of second side laces may face away from each other. The external terminal may further include a pair of second separated faces that is separated from the pair of second side faces as being separated from the main face. In this case, the element body has three thin portions sandwiched between the first side face and the pair of second side faces, respectively. It is possible to suppress the occurrence of cracking or chipping in all of these thin portions.

A multilayer coil component according to another aspect of the present disclosure includes an element body, a coil, and an external terminal. The element body includes a plurality of insulator layers that is laminated. The coil is disposed in the element body. The external terminal includes a plurality of conductor layers that is laminated. The external terminal is electrically connected to the coil. The element body includes a main face and a pair of side faces adjacent to each other. The main face has a rectangular shape. Each of the pair of side faces is adjacent to each other. Each of the pair of side faces is the main face. The external terminal is embedded in the element body in such a way as to be separated from the pair of side faces and to be exposed from the main face. The external terminal includes a second corner portion disposed adjacent to a first corner portion between the pair of side faces when viewed from a direction orthogonal to the main face. A radius of curvature of the second corner portion is greater than a radius of curvature of the first corner portion.

In the multilayer coil component, the external terminal is embedded in the element body in such a way as to be separated from the pair of side faces and to be exposed from the main face. Therefore, the element body includes a portion sandwiched between the pair of side faces and the external terminal. Such a portion has a smaller volume than other portions. Therefore, cracking or chipping is likely to occur. Therefore, when viewed from the direction orthogonal to the main face, the radius of curvature of the second corner portion of the external terminal adjacent to the first corner portion is greater than the radius of curvature of the first corner portion between the pair of side faces of the element body. Accordingly, the volume of the portion sandwiched between the pair of side faces and the external terminal can be increased. Therefore, it is possible to suppress the occurrence of cracking or chipping.

BRIEF DESCRIPTION OF I lit DRAWINGS

DETAILED DESCRIPTION

Figure 1:
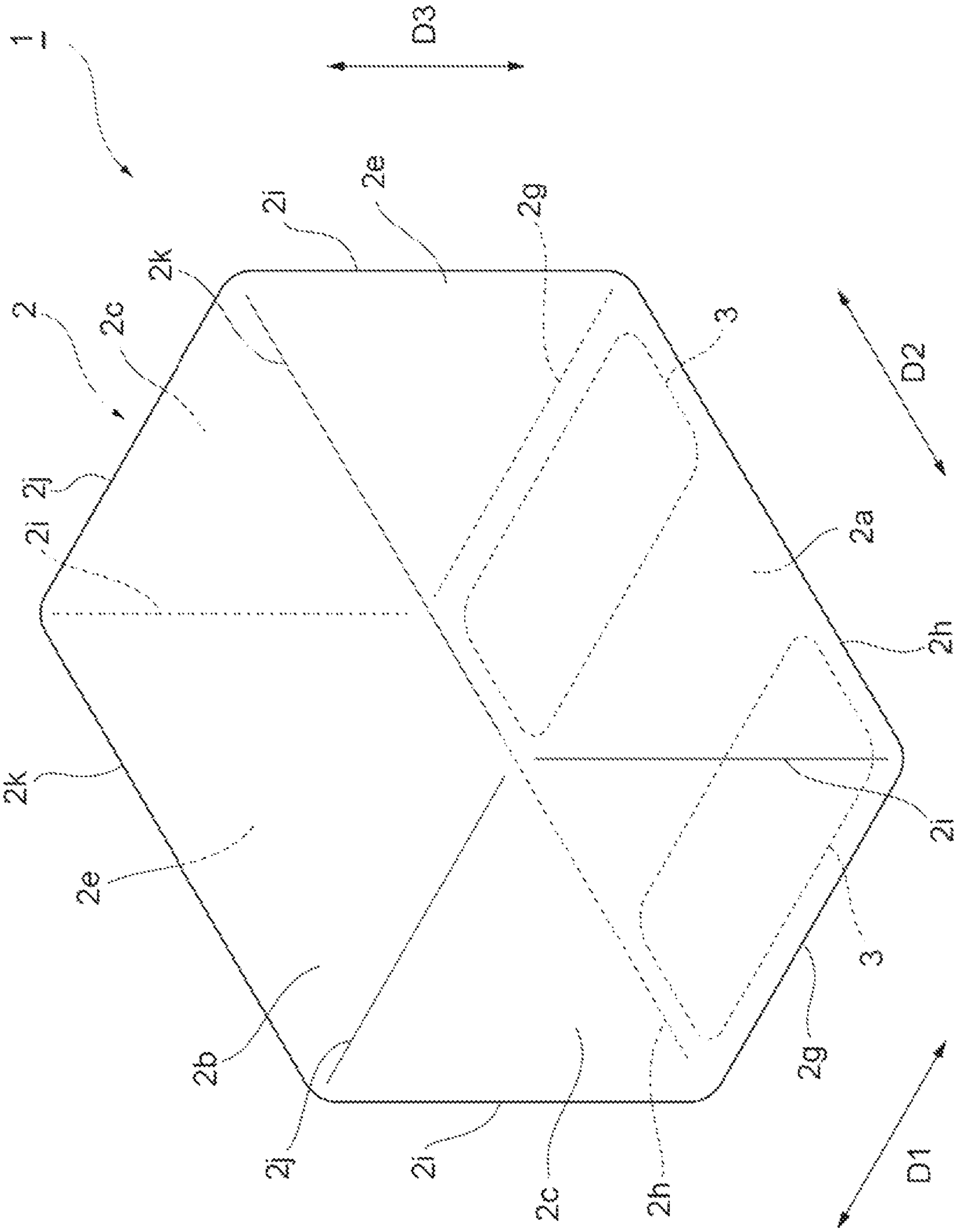
FIG. 1 is a perspective view of a multilayer coil component according to an embodiment.

Hereinafter, embodiments of the present invention will be described in detail with reference to the accompanying drawings. In the following description, the same elements or elements having the same functions are denoted with the same reference numerals and overlapped explanation is omitted.

As shown in FIGS. 1 to 5, the multilayer coil component 1 includes an element body 2 having a rectangular parallelepiped shape, a pair of external terminals 3, a coil 10, and connecting conductors 26 and 27. The rectangular parallelepiped shape includes a rectangular parallelepiped shape in which comer portions and ridge portions are chamfered and a rectangular parallelepiped shape in which comer portions and ridge portions are rounded. The multilayer coil component 1 is, for example, a high-frequency multilayer inductor. In FIGS. 1 to 4. the coil 10 and the connecting conductors 26 and 27 are not shown.

The element body 2 includes main faces 2*a* and 2*b* facing away from each other, a pair of side faces 2*c* facing away from each other, and a pair of side faces 2*e* facing away from each other. Hereinafter, a direction in which the pair of side laces 2*c* face away from each other is referred to as a first direction D1, a direction in which the pair of side faces 2*c* face away from each other is referred to as a second direction D2, and a direction in which the main faces 2*a* and 2*b* face away from each other is referred to as a third direction D3. The first direction D1, the second direction D2, and the third direction D3 intersect (here, orthogonal to) each other. In the present embodiment, the first direction D1 is the width direction of the element body 2. The second direction D2 is the length direction of the element body 2. The third direction D3 is the height direction of the element body 2.

The main faces 2*a* and 2*b*, the pair of side faces 2*c*, and the pair of side faces 2*c* each has a rectangular shape. The long-side direction of the main faces 2*a* and 2*b* coincides with the second direction D2. The short-side direction of the main faces 2*a* and 2*b* coincides with the first direction D1. The main face 2*a* is adjacent to the side faces 2*c* and 2*e*. The main face 2*b* is adjacent to the side faces 2*c* and 2*e*. Each side face 2*c* is adjacent to each side face 2*e*.

A ridge portion 2*g* between the main face 2*a* and the side face 2*c* has a chamfer shape. A ridge portion 2*h* between the main face 2*a* and the side face 2*e* has a chamfer shape. A ridge portion 2*i* between the side face 2*c* and the side face 2*e* has a chamfer shape. A ridge portion 2*j* between the main face 2*b* and the side face 2*c* has a chamfer shape. The ridge portion 2*k* between the main face 2*b* and the side face 2*e* has a chamfer shape. Each ridge portion 2*g*, 2*h*, 2*i*, 2*j* and 2*k* has a rounded chamfer shape, for example, by barrel polishing.

The main faces 2*a* and 2*b* extend in the second direction D2 in such a way as to connect the pair of side laces 2*c*. The main faces 2*a* and 2*b* also extend in the first direction D1 in such a way as to connect the pair of side faces 2*e*. The pair of side faces 2*c* extends in the third direction D3 in such a way as to connect the main faces 2*a* and 2*b*. The pair of side faces 2*c* also extends in the first direction D1 in such a way as to connect the pair of side faces 2*e*. The pair of side faces 2*e* extends in the third direction D3 in such a way as to connect the main faces 2*a* and 2*b*. The pair of side faces 2*e* also extends in the second direction D2 in such a way as to connect the pair of side faces 2*e*. The multilayer coil component 1 is, for example, mounted to an electronic device (for example, a circuit substrate or an electronic component) by soldering. In the multilayer coil component 1, the main face 2*a* constitutes a mounting surface opposing the electronic device.

Figure 5:
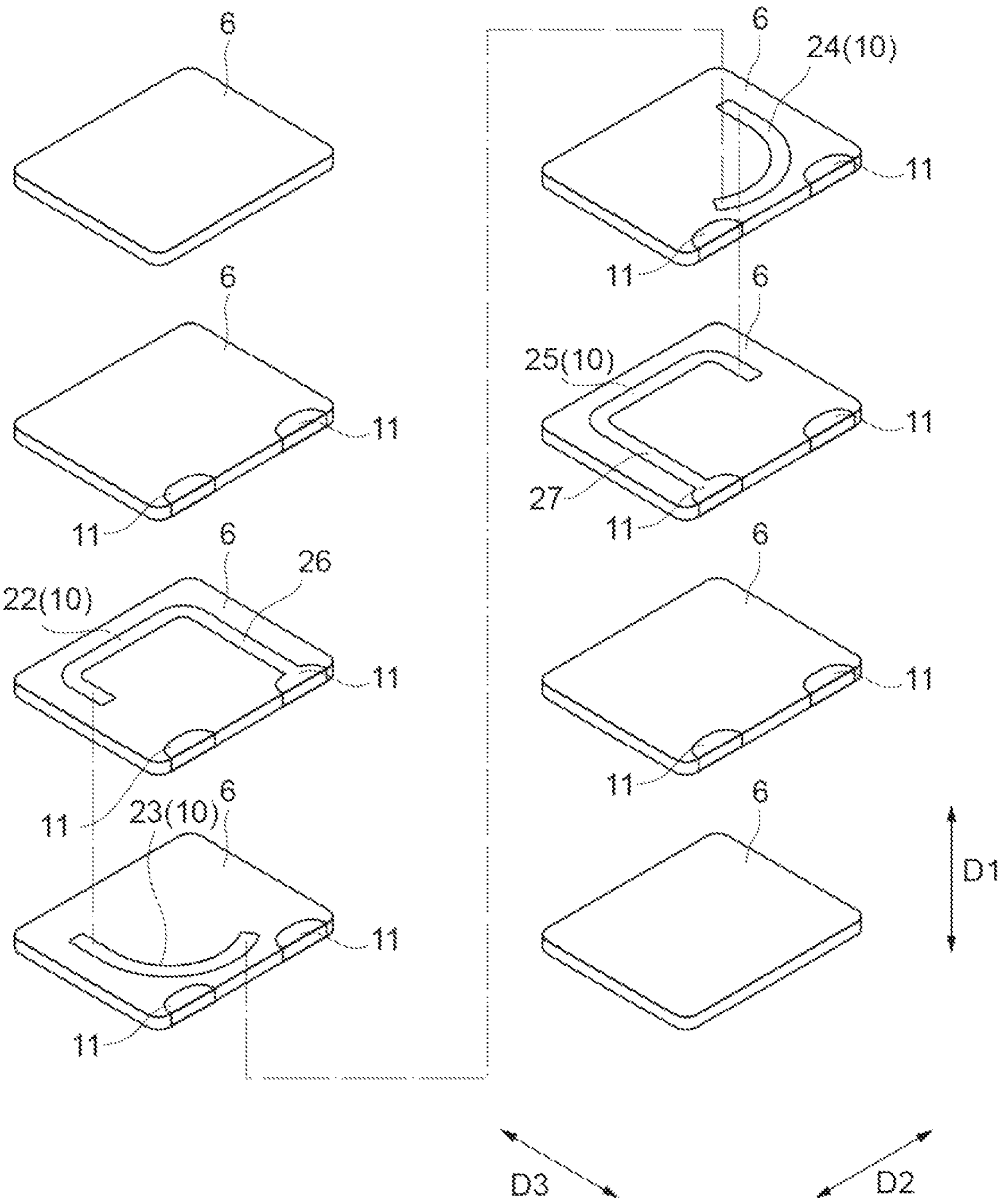
FIG. 5 is an exploded perspective view of a multilayer coil component in FIG. 1.

As shown in FIG. 5, the element body 2 is formed by laminating a plurality of insulator layers 6 in the first direction D1. The element body 2 includes the plurality of insulator layers 6 laminated in the first direction D1. In the element body 2, the laminating direction in which the plurality of insulator layers 6 is laminated coincides with the first direction D1. In the actual element body 2, the plurality of insulator layers 6 is integrated in such a way that boundaries between the insulator layers 6 cannot be visually recognized.

Each insulator layer 6 is formed of a dielectric material containing a glass component. That is, the element body 2 contains the dielectric material containing the glass component as a compound of elements constituting the element body 2. The glass component is. for example, borosilicate glass. The dielectric material is, for example, a dielectric ceramic such as $BaTiO_3$ based, $Ba(Ti,Zr)_3$ based, or $(Ba,Ca)TiO_3$ based. Each insulator layer 6 is formed of a sintered body of a ceramic green sheet containing a glass ceramic material.

Figure 2:
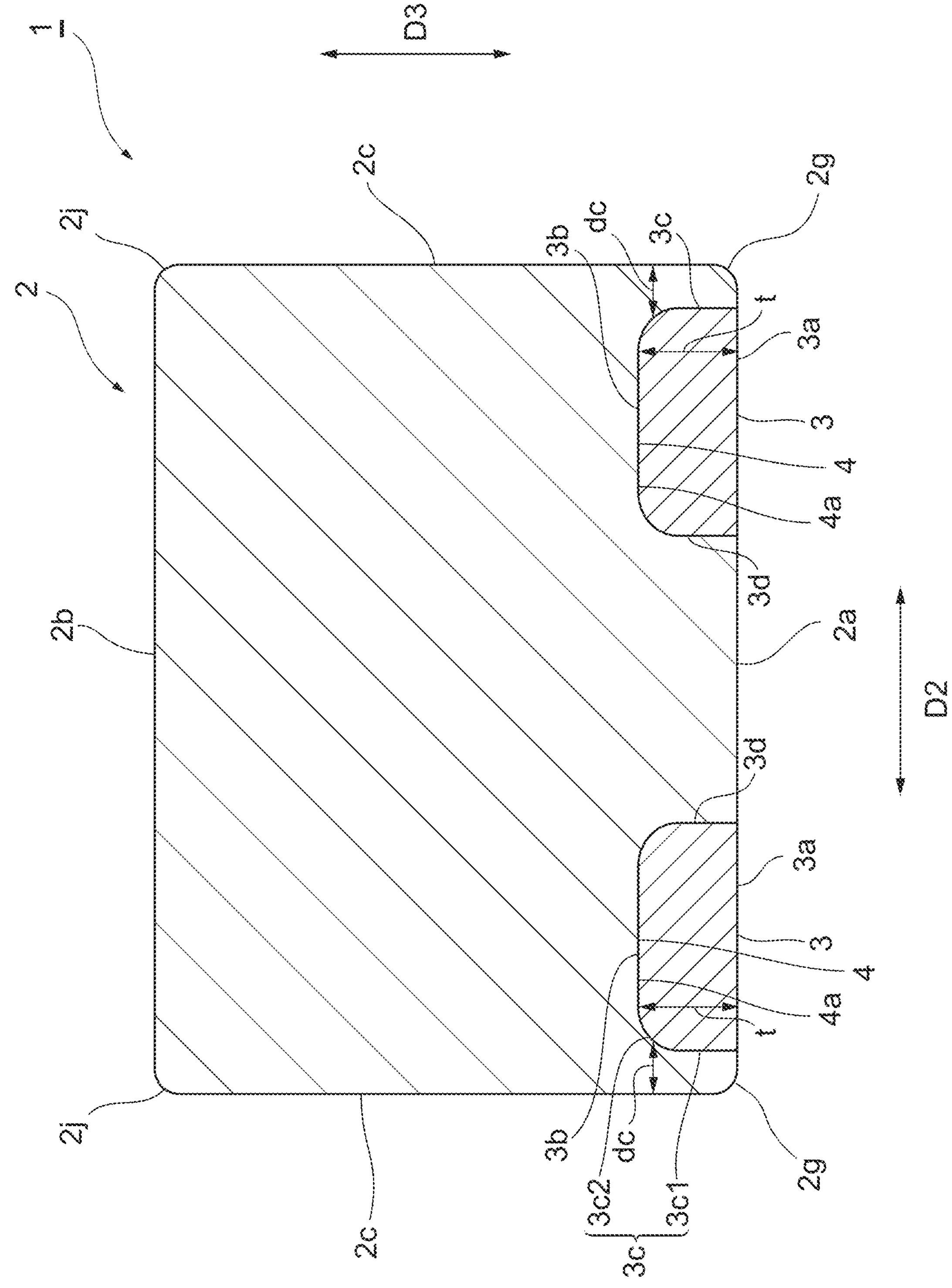
FIG. 2 is a cross-sectional view of a multilayer coil component in FIG. 1.
Figure 3:
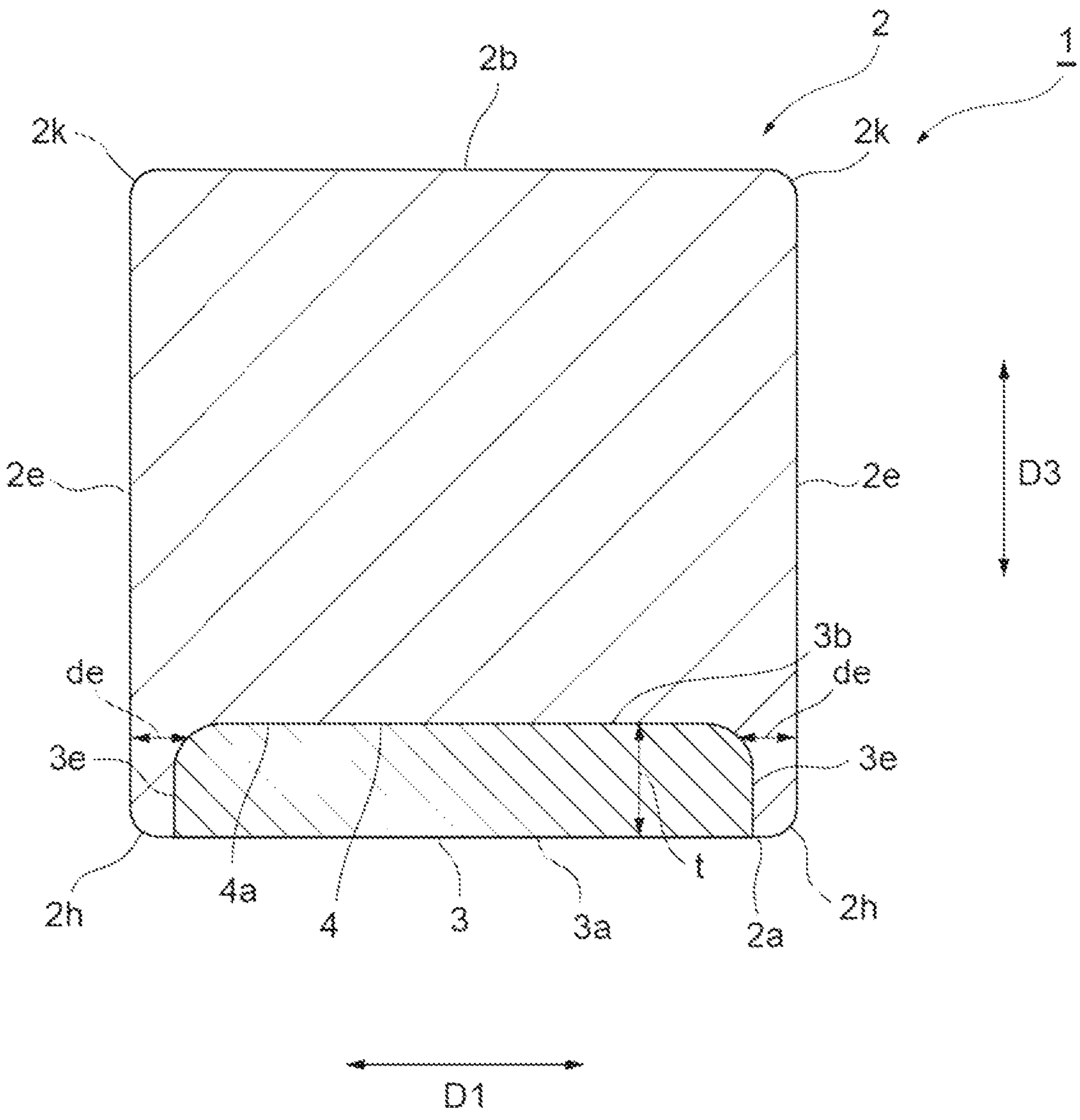
FIG. 3 is a cross-sectional view of a multilayer coil component in FIG. 1.
Figure 4:
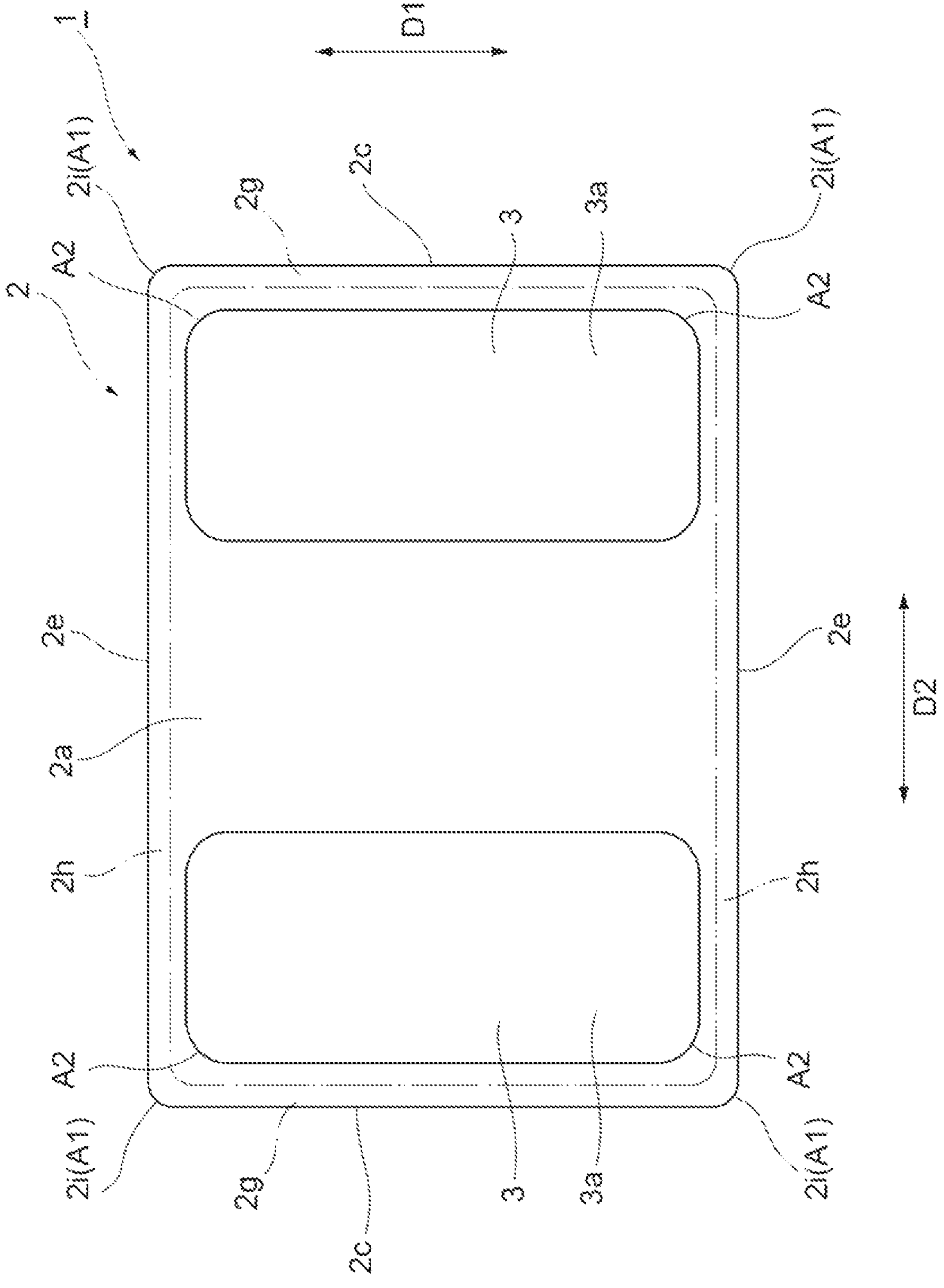
FIG. 4 is a bottom lace view of a multilayer coil component in FIG. 1.

As shown in FIG. 2 and FIG. 3, the main face 2*a* is provided with a pair of recesses 4. The pair of recesses 4 are separated from each other in the second direction D2. The pair of recesses 4 are separated from the pair of side faces 2*c* and the pair of side faces 2*e* when viewed front the direction (third direction D3) orthogonal to the main face 2*a*. One recess 4 is provided on one side face 2*c* side of the element body 2. The other recess 4 is provided on the other side face 2*c* side of the element body 2.

As shown in FIGS. 1 to 5, each external terminal 3 is electrically connected to an end of a coil 10. The pair of external terminals 3 is embedded in the element body 2 in such a way as to be exposed from the main face 2*a*. The pair of external terminals 3 is not exposed from the main face 2*b* and the side faces 2*c* and 2*e*. The pair of external terminals 3 are separated from each other in the second direction D2. The pair of external terminals 3 is separated from the pair of side faces 2*c* and the pair of side faces 2*e* when viewed from the direction (third direction D3) orthogonal to the main face 2*a*. One external terminal 3 is disposed on one side face 2*c* side of the element body 2. The other external terminal 3 is disposed on the other side face 2*c* side of the element body 2. The pair of external terminals 3 has the same shape.

It can also be said that the pair of external terminals 3 is disposed in the pair of recesses 4 provided on the main face 2*a*. Each recess 4 is a space recessed from the main face 2*a* toward the inside of the element body 2. Each recess 4 has a shape corresponding to the shape of the corresponding external terminal 3. Each external terminal 3 is in contact with the entire inner surface of the corresponding recess 4 without a gap.

Each external terminal 3 has a rectangular plate shape whose thickness direction is the third direction D3. The thickness t of the external terminal 3 is greater than the radius of curvature of each of the ridge portions 2*g* and 2*h*. The radii of curvature of the ridge portions 2*g* and 2*h* are, for example, equal to each other. Each external terminal 3 has an exposed face 3*a*, a bottom face 3*b*, connecting faces 3*c* and 3*d*, and a pair of connecting faces 3*e*. The exposed face 3*a* and the bottom lace 3*b* oppose each other in the thickness direction (third direction D3). The exposed face 3*a* faces the outside of the element body 2 and is exposed from the main face 2*a*. The exposed face 3*a* is located in substantially the same plane as the main face 2*a*. but may be located outside the element body 2 from the main face 2*a* or may be located inside the element body 2 from the main face 2*a*. That is, each external terminal 3 may protrude from the main face 2*a* to the outside of the element body 2, or may be recessed from the main face 2*a* to the inside of the element body 2.

The bottom face 3*b* faces the inside of the element body 2 and opposes the main face 2*b* and the bottom face 4*a* of the recess 4. The exposed face 3*a* and the bottom face 3*b* are, for example, rectangular planes. The long-side direction of the exposed face 3*a* and the bottom face 3*b* coincides with the first direction D1. The short-side direction of the exposed face 3*a* and the bottom face 3*b* coincides with the second direction D2.

Each of the connecting face 3*c*, 3*d* and 3*e* connects the exposed face 3*a* and the bottom face 3*b*. The connecting face 3*c* opposes a corresponding side face 2*e*. The corresponding side face 2*e* is the closer side face 2*c* of the pair of side faces 2*c*. The connecting faces 3*c* and 3*d* oppose each other in the second direction D2. The connecting laces 3*c* and 3*d* face opposite sides in the second direction D2. The pair of external terminals 3 is arranged in such a way that the connecting faces 3*d* opposes each other. The pair of connecting faces 3*e* opposes each other in the first direction D1. Each connecting face 3*e* faces a corresponding side face 2*e*. The corresponding side face 2*e* is the closer side face 2*e* of the pair of side faces 2*e*.

The connecting face 3*c* is separated from a plane including the corresponding side face 2*c* in the second direction D2 as being separated from the main face 2*a*. The plane including the side face 2*c* is a virtual plane. The distance dc at which the connecting face 3*c* and the plane including the side face 2*c* are separated from each other in the second direction D2 becomes longer as they are separated from the main face 2*a*. Here, the connecting face 3*c* may include a portion (first portion 3*c*1) parallel to the plane including the side face 2*c*. In this case, the distance dc is kept constant in the portion 3*cl* parallel to the plane including the side face 2*c*. The connecting face 3*c*, at another portion (second portion 3*c*2), at least tends to separate from the plane including the side face 2*c* as being separated from the main face 2*a*. The distance dc at least simply increases as the connecting face 3*c* is separated from the main face 2*a*. The simple increase means that there is no tendency to decrease.

The connecting face 3*c* is curved with a radius of curvature greater than that of the ridge portion 2*g*. The connecting face 3*c* is curved in such a way as to bulge toward the inside of the element body 2. In the present embodiment, a portion of the connecting face 3*c* on the exposed lace 3*a* side is parallel to the plane including the side face 2*c*. The plane including the side face 2*c* is a virtual plane. A portion of the connecting face 3*c* on the bottom face 3*b* side is curved with a radius of curvature greater than that of the ridge portion 2*g*. The entire connecting face 3*c* may be curved with a radius of curvature greater than that of the ridge portion 2*g*.

The connecting face 3*d* is curved in such a way as to approach the plane including the corresponding side face 2*c* as the connecting face 3*d* is separated from the main face 2*a* in a portion on the bottom face 3*b* side. The connecting face 3*d* is parallel to the plane including the side face 2*c* in a portion on the exposed face 3*a* side.

Each connecting face 3*e* is separated from the plane including the corresponding side face 2*e* in the first direction D1 as being separated front the main face 2*a*. The distance de at which the connecting face 3*e* and the planes including the side face 2*e* are separated from each other in the first direction D1 becomes longer as they are separated from the main face 2*a*. Here, the connecting face 3*e* may include a portion parallel to the plane including the side face 2*e*. In this case, the distance de is kept constant in the portion parallel to the plane including the side face 2*e*. The connecting face 3*e* at least tend to separate from the plane including the side face 2*e* as being separated from the main face 2*a*. The distance de at least simply increase as the connecting face 3*e* is separated from the main face 2*a*.

Each connecting face 3*e* is curved with a radius of curvature greater than the radius of curvature of the ridge portion 2*h*. The radii of curvature of the connecting faces 3*c*, 3*d*, and 3*e* are, for example, equal to each other. The connecting face 3*e* is curved in such a way as to bulge toward the inside of the element body 2. In the present embodiment, a portion of the connecting face 3*e* on the exposed face 3*a* side is parallel to the plane including the connecting face 3*e*. A portion of the connecting face 3*e* on the bottom face 3*b* side is curved with a radius of curvature greater than that of the ridge portion 2*h*. The entire connecting face 3*e* may be curved with a radius of curvature greater than that of the ridge portion 2*h*.

Each of the external terminals 3 is disposed outside each of the ridge portions 2*g* and 2*h* when viewed from the direction (third direction D3) orthogonal to the main face 2*a*. That is, each external terminal 3 is disposed within the range of the main face 2*a* when viewed from the third direction D3, and is not disposed across the ridge portions 2*g* and 2*h*. That is, the external terminal 3 is disposed apart from the plane including the corresponding side face 2*c* by a distance equal to or longer than the design value of the radius of curvature of the ridge portion 2*g* or the radius of curvature (measured value) of the ridge portions 2*i*. 2*j*. and 2*k*. The external terminal 3 is disposed apart from the plane including the corresponding side face 2*e* by a distance equal to or larger than the design value of the radius of curvature of the ridge portion 2*h* or the radius of curvature (measured value) of the ridge portions 2*i*, 2*j*, and 2*k*. The design values of the ridge portions 2*g*, 2*h*, 2*i*, 2*j*, and 2*k* are, for example, equivalent to each other. Since the ridge portions 2*g* and 2*h* are adjacent to the main face 2*a* on which the external terminal 3 is provided, the radius of curvature of the ridge portions 2*g* and 2*h* is affected by the external terminal 3 and may be smaller than the design value. Since the ridge portions 2*i*, 2*j* and 2*k* are not adjacent to the main face 2*a*, the radius of curvature of the ridge portions 2*i*, 2*j* and 2*k* is not affected by the external terminal 3 and is close to the design value. Accordingly, instead of the design values of the radii of curvature of the ridge portions 2*g* and 2*h*, the measured values of the radii of curvature of the ridge portions 2*i*, 2*j* and 2*k* may be used. Since the ridge portion 2*g* has a chamfer shape, the ridge portion 2*g* is not in contact with any of the plane including the side face 2*c* and a plane including the main face 2*a*. Since the ridge portion 2*h* has a chamfer shape, the ridge portion 2*h* is not in contact with any of the plane including the connecting face 3*e* and the plane including the main face 2*a*. The plane including the main face 2*a* is a virtual plane.

When viewed from the direction (first direction D3) orthogonal to the main face 2*a*, the element body 2 includes corner portions A1 between the side faces 2*c* and 2*e* adjacent to each other. The corner portion A1 is constituted by a ridge portion 2*i*. The element body 2 includes four comer portions A1. Each external terminal 3 includes four corner portions when viewed from the direction (third direction D3) orthogonal to the main face 2*a*. Two corner portions A2 of the four comer portions of the external terminal 3 are disposed adjacent to the corresponding corner portions A1. That is, the external terminal 3 includes the corner portions A2 disposed adjacent to the corner portions A1 between the side face 2*c* and the side face 2*e*. Note that "adjacent" means closest. The radius of curvature of each corner portion A2 is greater than the radius of curvature of the adjacent corner portion A1.

As shown in FIG. 5, the external terminal 3 is formed by laminating a plurality of electrode layers 11 laminated in the first direction D1. The external terminal 3 includes the plurality of electrode layers 11 laminated in the first direction D1. The plurality of electrode layers 11 is integrated in such a way that boundaries between the electrode layers 11 cannot be visually recognized. In the present embodiment, the number of electrode layers 11 is "6". Each electrode layer 11 is provided in a defective portion formed in the corresponding insulator layer 6. The defective portion constitutes a recess 4. The electrode layer 11 contains a conductive material. The conductive material contains, for example, Ag or Pd. The electrode layer 11 is formed as a sintered body of a conductive paste containing a conductive material powder. The conductive material powder contains, for example, Ag powder or Pd powder.

The electrode layer 11 may further contain a glass component. That is, the electrode layer 11 may be formed as a sintered body of a conductive paste containing a metal component made of a conductive material powder and a glass component. The glass component is a compound of elements constituting the element body 2, and is the same component as the glass component contained in the element body 2. The content of the glass component may be appropriately set. Each electrode layer 11 extends along the second direction D2.

The coil 10 and the connecting conductors 26 and 27 are disposed in the element body 2 and are not exposed from the element body 2. The coil 10 has a coil axis along the first direction D1. A pair of ends of the coil 10 is connected to a pair of external terminals 3 (sec FIG. 2). One end is electrically connected to one external terminal 3 by the connecting conductor 26. The other end is electrically connected to the other external terminal 3 by the connecting conductor 27.

The coil 10 includes a first coil conductor 22, a second coil conductor 23, a third coil conductor 24, and a fourth coil conductor 25. The first coil conductor 22, the second coil conductor 23, the third coil conductor 24, and the fourth coil conductor 25 are arranged in the order of the first coil conductor 22, the second coil conductor 23, the third coil conductor 24, and the fourth coil conductor 25 along the first direction D1. Each of the first coil conductor 22, the second coil conductor 23. the third coil conductor 24, and the fourth coil conductor 25 has a shape in which a part of a loop is interrupted, and includes one end portion and the other end portion.

The first coil conductor 22, the second coil conductor 23, the third coil conductor 24, and the fourth coil conductor 25 are formed to have a predetermined width (length in a direction intersecting the first direction D1) and a predetermined height (length in the first direction). The first coil conductor 22, the second coil conductor 23, the third coil conductor 24, and the fourth coil conductor 25 are formed to have the same width and height.

The first coil conductor 22 is located in the same layer as the pair of electrode layers 11. The first coil conductor 22 is connected to the other electrode layer 11 located in the same layer via the connecting conductor 26. The connecting conductor 26 is located in the same layer as the pair of electrode layers 11 and the first coil conductor 22. The connecting conductor 26 connects the first coil conductor 22 and the second electrode layer 11. One end of the first coil conductor 22 is connected to the connecting conductor 26. One end of the first coil conductor 22 constitutes the other end of the coil 10. In the present embodiment, the first coil conductor 22, the connecting conductor 26. and the second electrode layer 11 are integrally formed.

The second coil conductor 23 is located in the same layer as the pair of electrode layers 11. The second coil conductor 23 is separated from the pair of electrode layers 11 located in the same layer. The other end of the first coil conductor 22 and one end of the second coil conductor 23 are adjacent to each other in the first direction D1 and are in direct contact with each other. When viewed from the first direction D1, the other end of the first coil conductor 22 and one end of the second coil conductor 25 overlap each other.

The third coil conductor 24 is located in the same layer as the pair of electrode layers 11. The third coil conductor 24 is separated from the pair of electrode layers 11 located in the same layer. The other end of the second coil conductor 23 and one end of the third coil conductor 24 are adjacent to each other in the first direction D1 and are in direct contact with each other. When viewed from the first direction D1, the other end portion of the second coil conductor 23 and one end portion of the third coil conductor 24 overlap each other.

The fourth coil conductor 25 is located in the same layer as the pair of electrode layers 11. The fourth coil conductor 25 is connected to the first electrode layer 11 located in the same layer via a connecting conductor 27. The connecting conductor 27 is located in the same layer as the pair of electrode layers 11 and the fourth coil conductor 25. The connecting conductor 27 connects the fourth coil conductor 25 and one electrode layer 11. The other end of the fourth coil conductor 25 is connected to the connecting conductor 27. The other end of the fourth coil conductor 25 constitutes one end of the coil 10. In the present embodiment, the fourth coil conductor 25, the connecting conductor 27, and the first electrode layer 11 are integrally formed.

The first coil conductor 22, the second coil conductor 23, the third coil conductor 24, the fourth coil conductor 25, and the connecting conductors 26 and 27 include conductive materials. The conductive material contains, for example, Ag or Pd. The first coil conductor 22, the second coil conductor 23, the third coil conductor 24, the fourth coil conductor 25, and the connecting conductors 26 and 27 are formed as sintered bodies of a conductive paste containing a conductive material powder. The conductive material powder contains, for example, Ag powder or Pd powder.

In the present embodiment, the first coil conductor 22, the second coil conductor 23, the third coil conductor 24, the fourth coil conductor 25, and the connecting conductors 26 and 27 contain the same conductive material as the external terminals 3. The first coil conductor 22, the second coil conductor 23, the third coil conductor 24, the fourth coil conductor 25, and the connecting conductors 26 and 27 may include a conductive material different from that of each external terminal 3.

The first coil conductor 22, the second coil conductor 23, the third coil conductor 24, the fourth coil conductor 25, and the connecting conductors 26 and 27 are provided in a defective portion formed in the corresponding insulator layer 6. The first coil conductor 22, the second coil conductor 23, the third coil conductor 24, the fourth coil conductor 25, and the connecting conductors 26 and 27 are formed by firing the conductive paste located in the defective portion formed on the green sheet.

The defective portion formed in the green sheet is formed, for example, by the following process. First, an element body paste containing a constituent material of the insulator layer 6 and a photosensitive material is applied onto a substrate to form a green sheet. The substrate is, for example, a PBT film. The photosensitive material contained in the element body paste may be either a negative type or a positive type, and a known material can be used. Next, the green sheet is exposed and developed by a photolithography method using a mask corresponding to the defective portion to form the defective portion in the green sheet on the substrate. The green sheet having the defective portion is an element body pattern.

The electrode layer 11, the first coil conductor 22, the second coil conductor 23, the third coil conductor 24, the fourth coil conductor 25, and the connecting conductors 26 and 27 are formed by, for example, the following process.

First, a conductive paste containing a photosensitive material is applied onto a substrate to form a conductive material layer. The photosensitive material contained in the conductive paste may be either a negative type or a positive type, and a known photosensitive material can be used. Next, the conductive material layer is exposed and developed by a photolithography method using a mask corresponding to the defective portion, and a conductive pattern corresponding to the shape of the defective portion is formed on the base material.

The multilayer coil component 1 is obtained, for example, by the following process following the above-described process. The conductor pattern is combined with the defective portion of the element body pattern to prepare a sheet in which the element body pattern and the conductor pattern are in the same layer. A laminate obtained by laminating a predetermined number of prepared sheets is heat-treated, and then a plurality of green chips are obtained from the laminate. In this process, for example, the green laminate is cut into chips by a cutting machine. Thus, a plurality of green chips having a predetermined size are obtained. Next, the green chip is fired. By this firing, a multilayer coil component 1 is obtained. A plating layer may be formed on the surface of each external terminal 3. The plating layer is formed by, for example, electroplating or electroless plating. The plating layer contains, for example, Ni, Sn, or Au.

Since the multilayer coil component 1 is formed using such a photolithography method, the external terminal 3 can be formed in an arbitrary shape. That is. it is possible to easily realize a shape in which each connecting face 3*c*, 3*d*, and 3*e* is curved with a desired curvature radius. In the above-described manufacturing method, the laminate is formed by preparing the sheet in which the element body pattern and the conductor pattern are formed in the same layer and then laminating the prepared predetermined number of sheets, but the laminate may be formed by another method. For example, the laminate may be formed while sequentially forming the element body pattern and the conductor pattern on one substrate for lamination by a photolithography method. That is, the element body 2 may have a plurality of insulator layers 6 having a laminated structure regardless of the manufacturing method. The external terminal 3 may have a plurality of electrode layers 11 having a laminated structure regardless of the manufacturing method.

As described above, in the multilayer coil component 1 according to the present embodiment, the external terminal 3 is embedded in the element body 2 in such a way as to be separated from the side faces 2*c* and 2*e* and exposed from the main face 2*a*. Therefore, the element body 2 includes the portions sandwiched between the side faces 2*c* and the external terminal 3 and the portions sandwiched between the side faces 2*e* and the external terminal 3. Since such portions are thinner than other portions, cracking or chipping is likely to occur.

The connecting face 3*c* of the external terminal 3 is separated from the side face 2*c* as being separated from the main face 2*a*. Accordingly, in the element body 2, the thickness (length in the second direction D2) of the portion sandwiched between the side face 2*c* and the external terminal 3 is increased, and the occurrence of cracking or chipping can be suppressed. The connecting face 3*e* of the external terminal 3 is separated from the side face 2*e* as being separated from the main face 2*a*. As a result, in the element body 2, the thickness (length in the first direction D1) of the portion sandwiched between the side face 2*e* and the external terminal 3 is increased, and the occurrence of cracking or chipping can be suppressed. The area of the exposed face 3*a* of the external terminal 3 can be kept large. The exposed face 3*a* is used for mounting. Therefore, it is possible to suppress a decrease in mounting strength.

A ridge portion 2*g* between the main face 2*a* and the side face 2*c* has a chamfer shape. Therefore, since the thin portion sandwiched between the side lace 2*c* and the external terminal 3 is further thinned, cracking or chipping is more likely to occur. Therefore, the configuration in which the external terminal 3 has the connecting face 3*c* as described above is more effective. A ridge portion 2*h* between the main face 2*a* and the side face 2*e* has a chamfer shape. Therefore, since the thin portion sandwiched between the side face 2*e* and the external terminal 3 is further thinned, cracking or chipping is more likely to occur. Therefore, the configuration in which the external terminal 3 includes the connecting face 3*e* as described above is more effective.

The ridge portions 2*g* and 2*h* have a rounded chamfer shape, and the thickness t of the external terminal 3 is greater than the radius of curvature of the ridge portions 2*g* and 2*h*. Therefore, as compared with the case where the thickness t of the external terminal 3 is equal to or less than the radius of curvature of the ridge portion 2*g*, the thin portion interposed between the side face 2*c* and the external terminal 3 is longer in the thickness direction (the third direction D3) of the external terminal 3. Therefore, since cracking or chipping is more likely to occur. the configuration in which the external terminal 3 includes the connecting face 3*c* is more effective. In addition, compared to the case where the thickness t of the external terminal 3 is equal to or less than the radius of curvature of the ridge portion 2*h*, the thin portion interposed between the side face 2*c* and the external terminal 3 is long in the thickness direction of the external terminal 3. Therefore, since cracking or chipping is more likely to occur, the configuration in which the external terminal 3 includes the connecting face 3*c* is more effective.

The ridge portion 2*g* has a rounded chamfer shape. The connecting face 3*c* is curved with a radius of curvature greater than that of the ridge portion 2*g*. Therefore, the thickness of the thin portion sandwiched between the side face 2*c* and the external terminal 3 can be further increased. The ridge portion 2*h* has a rounded chamfer shape, and the connecting face 3*c* is curved with a radius of curvature greater than that of the ridge portion 2*h*. Therefore, the thickness of the thin portion sandwiched between the side face 2*c* and the external terminal 3 can be further increased.

The external terminal 3 is disposed outside the ridge portions 2*g* and 2*h*. Therefore, the ridge portions 2*g* and 2*h* can be formed only by the element body 2. The ease of polishing depends on the material. Therefore, a chamfer shape is more easily formed by polishing in the ridge portions 2*g* and 2*h* constituted only by the element body 2 than in the ridge portions constituted by a plurality of materials. As a result, the shape of the product can be improved, and cracking or chipping of the element body 2 can be suppressed.

For example, the external terminal 3 is more difficult to be polished than the element body 2 before firing. Therefore, when the external terminal 3 is also exposed from the side face 2*c* to form the ridge portion 2*g*, the ridge portion 2*g* is difficult to be polished and to form a chamfer shape. For this reason, the ridge portion 2*g* is likely to have a pointed shape and become a starting point of cracking or chipping compared to the other ridge portions 2*h*, 2*i*, 2*j*, and 2*k* formed of the element body 2. The external terminal 3 is not exposed from the other ridge portions 2*h*, 2*i*, 2*j*, and 2*k*. When the polishing conditions are set in accordance with the external terminal 3, the external terminal 3 is not exposed, and the other ridge portions 2*h*. 2*i*. 2*j*, and 2*k* formed of the element body 2 are excessively polished, so that the element body 2 easily rolls. Therefore, it is difficult to handle the multilayer coil component 1. Although the case where the external terminal 3 is exposed from the side face 2*c* has been described as an example, the same problem occurs when the external terminal 3 is exposed from the side face 2*c*.

Even when the external terminal 3 is separated from the plane including the side face 2*c*. when the distance by which the external terminal 3 is separated from the plane including the side face 2*c* is insufficient, specifically, when the distance is shorter than the design value of the radius of curvature of the ridge portions 2*g*, 2*h*, 2*i*, 2*j*, and 2*k*. polishing of the ridge portion 2*g* is inhibited by the external terminal 3. Accordingly, it is difficult to set the radius of curvature of the ridge portion 2*g* to the design value. Therefore, the ridge portion 2*g* easily becomes a starting point of cracking or chipping. When the polishing conditions are adjusted to the ridge portion 2*g*. instead of setting the radius of curvature of the ridge portion 2*g* to the design value, the other ridge portions 2*h*. 2*i*. 2*j*, and 2*k* are excessively polished, and the radius of curvature exceeds the design value. Therefore, the element body 2 easily rolls, and handling of the multilayer coil component 1 becomes difficult. Although the case where the distance by which the external terminal 3 is separated from the plane including the side face 2*c* is insufficient has been described as an example, the same problem occurs when the distance by which the external terminal 3 is separated from the plane including the side face 2*c* is insufficient.

In the multilayer coil component 1, the external terminal 3 is embedded in the element body 2 in such a way as to be separated from the side faces 2*c* and 2*c* adjacent to each other and exposed from the main face 2*a*. Therefore, the element body 2 includes the portions sandwiched between the side face 2*c*, the side face 2*e*, and the external terminal 3. Since such portions have a smaller volume than the other portions, cracking or chipping is likely to occur. Therefore, when viewed from the direction orthogonal to the main face 2*a* (the third direction D3), the radius of curvature of the corner portion A2 of the external terminal 3 adjacent to the comer portion AI is configured to he greater than the radius of curvature of the comer portion AI between the side faces 2*c* and 2*e* of the element body 2. As a result, the volume of the portions sandwiched between the side face 2*c*, the side face 2*e*, and the external terminal 3 is increased, and the occurrence of cracking or chipping can be suppressed.

Since the pair of external terminals 3 is exposed only from the main face 2*a*, the mounting area can be reduced. For example, when the external terminal 3 is exposed from the main face 2*a* and the side face 2*c*, the solder is also formed on the side face 2*c*. so that the mounting area is increased.

The present invention is not necessarily limited to the above-described embodiments, and various modifications can be made with the spirit and the scope thereof.

Figure 6:
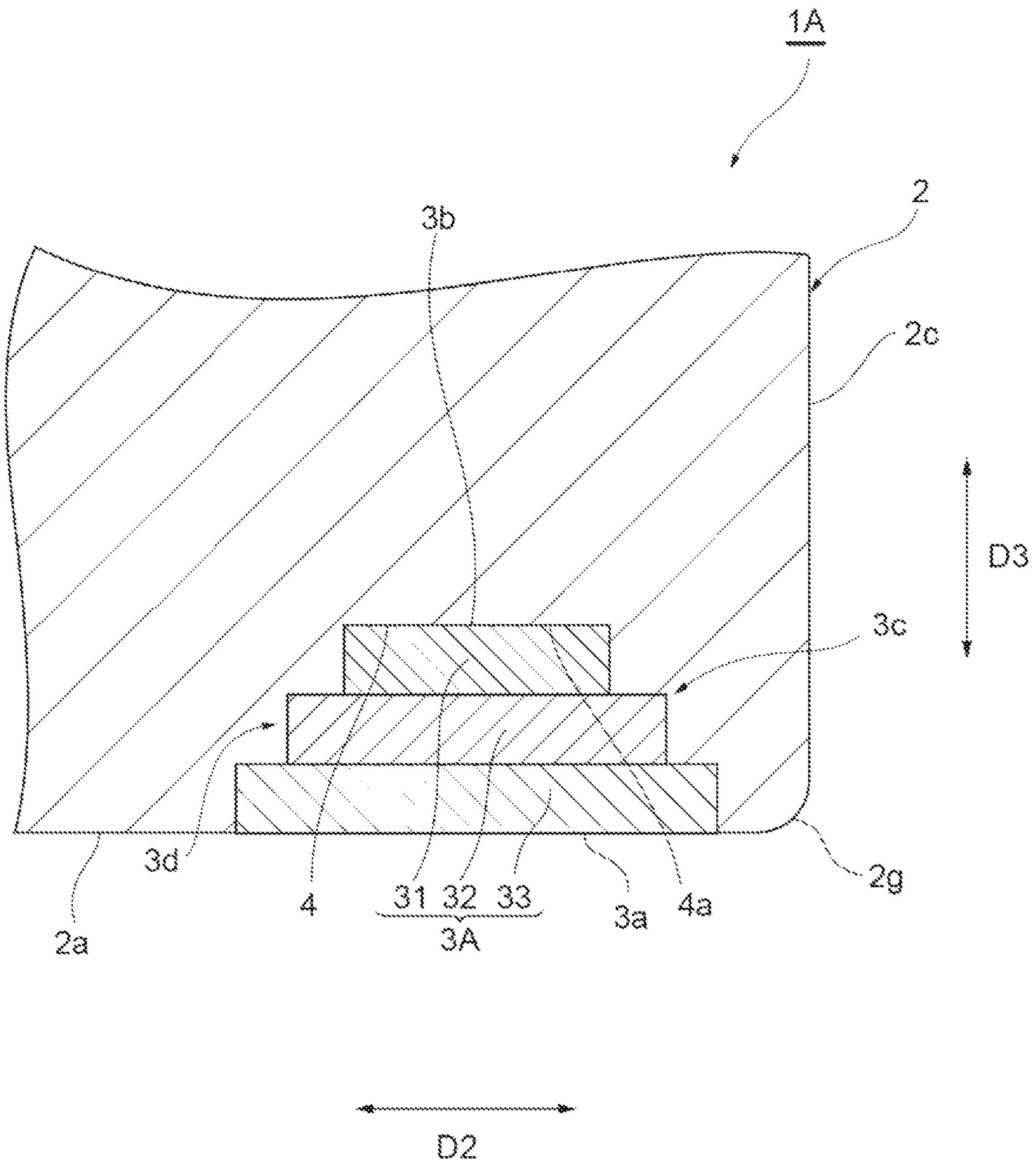
FIG. 6 is a partially enlarged cross-sectional view of a multilayer coil component according to a first modification.

FIG. 6 is a partially enlarged cross-sectional view of a multilayer coil component according to a first modification. The multilayer coil component 1A according to the first modification shown in FIG. 6 is different from the multilayer coil component 1 shown in FIGS. 1 to 5 in that the multilayer coil component 1A includes an external terminal 3A in which a plurality of electrode layers 31 32 and 33 are laminated in the third direction D3. The plurality of insulator layers 6 may be laminated in the third direction D3. or may be laminated in the first direction D1 or the second direction D2.

The plurality of electrode layers 31 32 and 33 are arranged in this order from the main face 2*b* side. That is, the electrode layer 31 is disposed closest to the main face 2*b*, and the electrode layer 33 is disposed closest to the main face 2*a*. The electrode layer 32 is disposed between the electrode layer 31 and the electrode layer 33. The exposed face 3*a* is constituted by one face in the thickness direction (third direction D3) of the electrode layer 33. The bottom face 3*b* is constituted by one face in the thickness direction (third direction D3) of the electrode layer 31.

The plurality of electrode layers 31 32 and 33 may have different lengths in the second direction D2. For example, the plurality of electrode layers 31 32 and 33 are arranged in such a way that the center positions thereof in the second direction D2 coincide with each other. For this reason, in the plurality of electrode layers 31 32 and 33, the positions of the end faces on the side face 2*c* side and the side face 2*d* side are shifted stepwise. That is, each of the connecting face 3*c* and the connecting face 3*d* has a stepped shape. As described above, also in the multilayer coil component 1A, the connecting face 3*c* is separated from the side face 2*c* as being separated from the main face 2*a*. Therefore, also in the multilayer coil component 1A, the portion sandwiched between the side face 2*c* and the external terminal 3 can be thick to suppress the occurrence of cracking or chipping.

Figure 7:
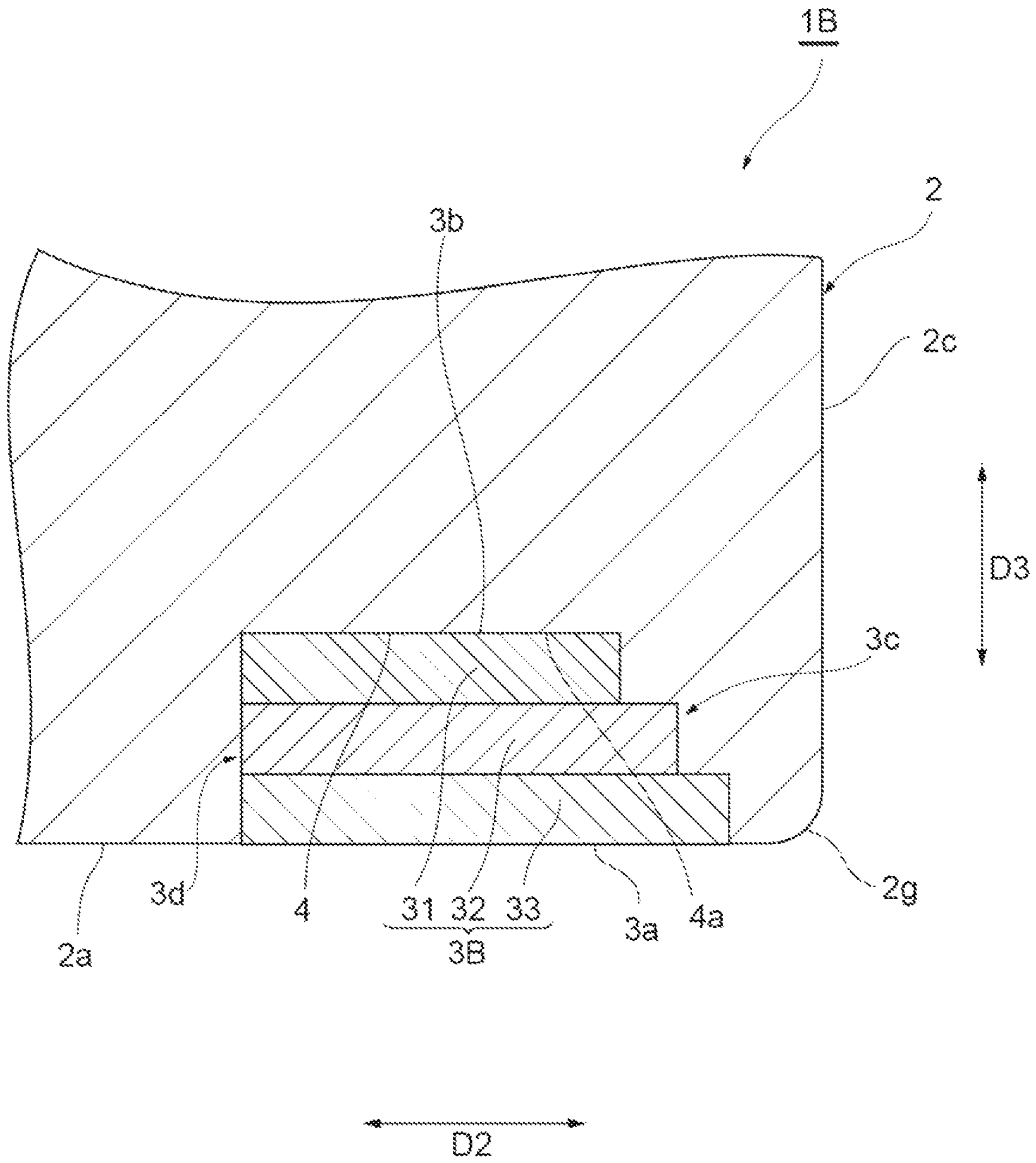
FIG. 7 is a partially enlarged cross-sectional view of a multilayer coil component according to a second modification.

FIG. 7 is a partially enlarged cross-sectional view of a multilayer coil component according to a second modification. The multilayer coil component 1B according to the second modification shown in FIG. 7 is different from the multilayer coil component 1A (see FIG. 6) in that the multilayer coil component 1B includes an external terminal 3B. The external terminal 3B is different from external terminal 3A (sec FIG. 6) in the arrangement of the electrode layers 31, 32 and 33. In the external terminal 3B, the plurality of electrode layers 31, 32 and 33 are arranged so that the connecting face 3*d* forms one plane along the third direction D3. The connecting face 3*c* of the external terminal 3B has a stepped shape like the external terminal 3A. Therefore, also in the multilayer coil component 1B, the portion sandwiched between the side face 2*c* and the external terminal 3 can be thick to suppress the occurrence of cracking or chipping.

In the multilayer coil component 1, the coil 10 has the coil axis along the first direction D1 and includes the first coil conductor 22, the second coil conductor 23, the third coil conductor 24, and the fourth coil conductor 25. However, the coil axis of the coil 10 may not be along the first direction D1. The coil axis of the coil 10 may be along the second direction D2 or the third direction D3, for example. The number of coil conductors constituting the coil 10 is not limited to four.

In the multilayer coil component 1, each ridge portion 2*g*, 2*h*, 2*i*, 2*j* and 2*k* have a rounded chamfer shape, but each ridge portion 2*g*, 2*h*, 2*i*, 2*j* and 2*k* may have a chamfer shape consisting of a plane or may not have a chamfer shape.

In the multilayer coil component 1, the external terminal 3 includes six electrode layers 11, but may include at least two or more electrode layers 11. In the multilayer coil components 1A and 1B, the external terminals 3A and 3B are constituted by three electrode layers 31 32 and 33. but may be constituted by at least two or more electrode layers.

In the multilayer coil components 1A and 1B, the connecting face 3*c* has a stepped shape, but the connecting face 3*e* may have a stepped shape. In this case, the thickness of the portion sandwiched between the side face 2*c* and the external terminal 3 can be increased to suppress the occurrence of cracking or chipping.

The invention claimed is:

1. A multilayer coil component comprising:
an element body including a plurality of insulator layers that is laminated;
a coil disposed in the element body; and
an external terminal including a plurality of conductor layers that is laminated and electrically connected to the coil,
wherein the element body includes a main face and a first side face adjacent to the main face,
wherein the external terminal is embedded in the element body in such a way as to be separated from the first side face and exposed from the main face, and
wherein the external terminal includes a first face that is separated from the first side face, the first face including:
a first portion that extends from the main face in a direction away from the main face and is parallel with the first side face in the direction away from the main face, and
a second portion that extends from an end of the first portion in the direction away from the main face and that becomes more distant from the first side dace when extending farther away from the main face.

2. The multilayer coil component according to claim 1, wherein a ridge portion between the main face and the first side face has a chamfer shape.

3. The multilayer coil component according to claim 2, wherein the ridge portion has a rounded chamfer shape, and
a thickness of the external terminal is greater than a radius of curvature of the ridge portion.

4. The multilayer coil component according to claim 2, wherein the ridge portion has a rounded chamfer shape, and
the first face is curved with a radius of curvature greater than a radius of curvature of the ridge portion.

5. The multilayer coil component according to claim 2, wherein the external terminal is disposed outside the ridge portion.

6. The multilayer coil component according to claim 1, wherein the element body further includes a pair of second side faces each adjacent to the main face,
the first side face is adjacent to each of the pair of second side faces, and
the pair of second side faces face away from each other, and
the external terminal further includes a pair of second faces, each second face being separated from a respective one of the pair of second side faces.

7. A multilayer coil component comprising:
an element body including a plurality of insulator layers that is laminated;
a coil disposed in the element body; and
an external terminal including a plurality of conductor layers that is laminated and electrically connected to the coil,
wherein the element body includes a main face that has a rectangular shape and a pair of side faces adjacent to each other and adjacent to the main face,
wherein the external terminal is embedded in the element body in such a way as to be separated from the pair of side faces and to be exposed from the main face; and includes a second corner portion disposed adjacent to a first corner portion between the pair of side faces when viewed from a direction orthogonal to the main face,
wherein a radius of curvature of the second corner portion is greater than a radius of curvature of the first corner portion, and
wherein the external terminal includes a first face that is separated from the first side face, the first face including
a first portion that extends from the main face in a direction away from the main face and is parallel with the first side face in the direction away from the main face, and
a second portion that extends from an end of the first portion in the direction away from the main face and that becomes more distant from the first side dace when extending farther away from the main face.

* * * * *